March 8, 1938.  W. J. SHERMAN  2,110,181
CUTTING TORCH
Original Filed Nov. 30, 1931   2 Sheets-Sheet 1
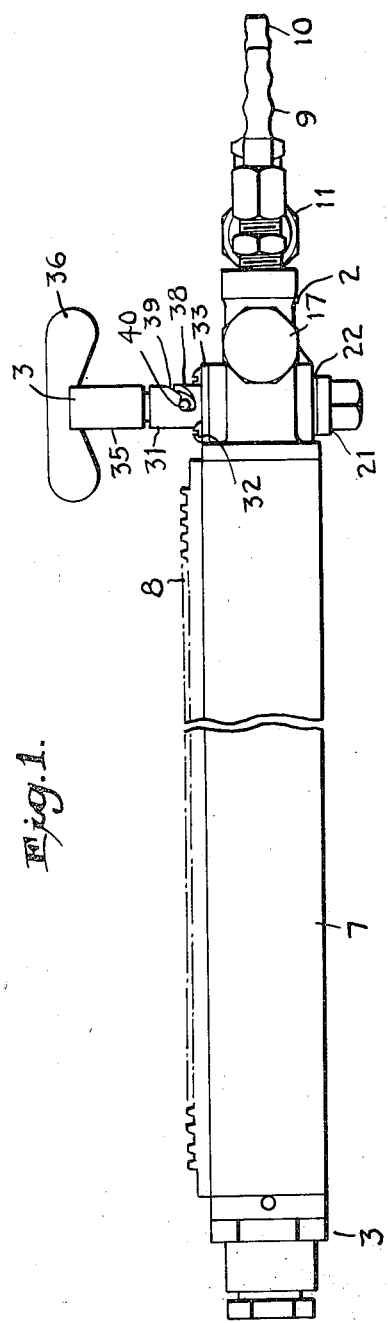

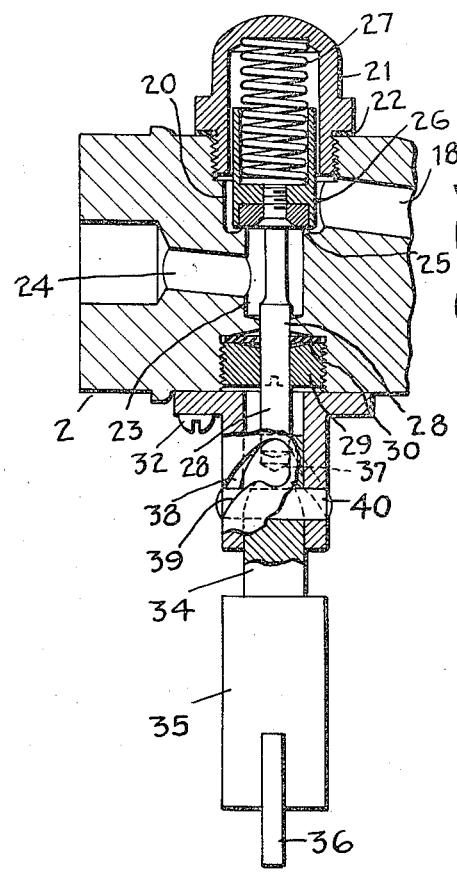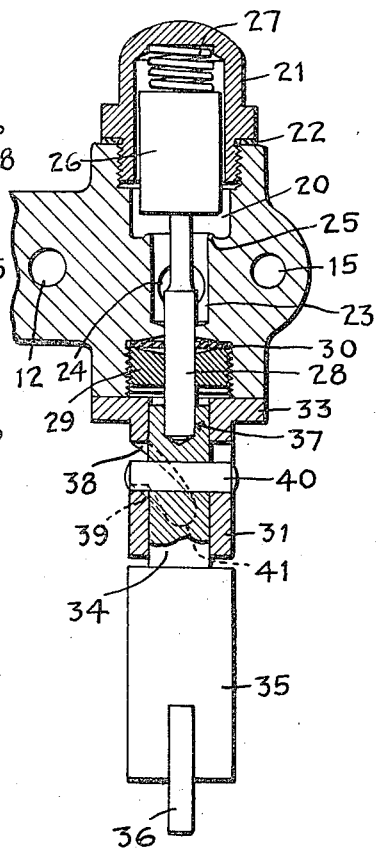

Patented Mar. 8, 1938

2,110,181

UNITED STATES PATENT OFFICE 2,110,181

CUTTING TORCH

William J. Sherman, Bayonne, N. J., assignor to Air Reduction Company, Incorporated, New York, N. Y., a corporation of New York Original application November 30, 1931, Serial No. 577,990. Divided and this application October 17, 1934, Serial No. 748,595

3 Claims. (Cl. 158—27.4)

This invention relates to cutting torches, and is particularly advantageous for controlling the cutting oxygen supply on machine cutting torches.

Cutting machines, and especially universal cutting machines, ordinarily employ a tracer or template-follower for moving the torch along a path similar to a sketch or template. The torch-supporting mechanism of the cutting machine is easily movable and care must be exercised to avoid displacing the torch and its guiding tracer or template-follower if it becomes necessary to handle the torch during the operation of the cutting machine.

In hand cutting torches, plunger-operated valves having elements thrust against their seats by springs and moved into open position by various types of trigger or lever mechanisms are known, but such valve-operating devices are not suitable for machine torches because the force exerted against the trigger or lever is likely to displace the torch and its supporting and guiding mechanism.

Displacement of the torch by the turning on of the cutting oxygen supply will cause the cut to start in the wrong place, or the movement may be so great that the jet strikes cold metal and will not cut. If the torch is displaced when the attendant operates the valve so as to throttle the flow of cutting oxygen, the accuracy of the reproduction is destroyed and the work may be rendered useless. Even in closing of the valve to shut off the cutting oxygen, the torch must not be displaced if it is still over the work because if the force required to operate the valve shifts the torch and its supporting means the displacement occurs while the valve is still open and the cut progressing.

The machine cutting torches of the prior art have been equipped with turn-cocks for controlling the cutting oxygen supply. The force required to rotate the handle of a turn-cock is a couple, and there should be no resultant or reaction tending to shift the position of the torch or its supporting means. In practice, however, turn-cocks have not been satisfactory because of the difficulty in operating them, their liability to leakage, and the high cost of manufacture and repair. In order to insure against leaks, it has proved necessary to have the cocks so tight and stiff in action that it was difficult and often impossible for an operator to avoid exerting an unbalanced force and displacing the torch in his effort to make the turn-cock yield. The skill and labor required to grind in the turn-cock valves to their seats made the manufacture of the torches costly, and made it necessary for users to return them to the manufacturer for repairs, with the resulting expense and loss of time in the use of the torch.

An object of the invention is to provide a machine cutting torch with valve mechanism which is inexpensive to manufacture and repair, and which operates so easily that it can be used without danger of displacing the torch or its supporting and guiding mechanism when the valve is opened or closed during the operation of the machine.

This application is a division of my copending application Serial No. 577,990, filed November 30, 1931.

Other objects, features and advantages of the invention will appear or be pointed out as the specification proceeds.

In the accompanying drawings:

Fig. 1 is a side view of a machine cutting torch embodying the invention. The torch is broken out at an intermediate region, and the removable tip is not shown. From the position of the handle of the cutting oxygen control, that valve may be assumed to be open.

Fig. 2 is a view that may be said to bear the relation of a bottom plan to Fig. 1, the rear block and most of the shell being in section.

Fig. 3 is a section taken on the line 3—3 of Fig. 2, the valve being closed.

Fig. 4 is a section taken on the line 4—4 of Fig. 2, the valve being open.

The torch shown in these views as an illustration of the invention has a valve block 2, a head 3, conduit tubes 4, 5 and 6 extending between the block and head, and a shell 7 enclosing the tubes and forming the body of the torch. To one side of the torch body, a rack 8 may be applied for adjusting the torch, in a holder, toward and from the work. It is unnecessary to show the socket in the head which receives the tip, not represented in the drawings, or the passages in the head which conduct the gases from the tubes 4, 5 and 6 to the entrance ports of the tip. Suffice it to say that the tube 4 conducts preheating oxygen and the tube 6 conducts acetylene or other preheating fuel gas, which is mixed with the preheating oxygen to form the preheating jets, while the central tube 5 conducts the cutting oxygen, which supplies the cutting jet.

The block 2 has an oxygen connection 9 and an acetylene connection 10, adapted to receive the usual hose lines. From the socket of the acetylene connection, which is shown provided with an adjusting valve 11, a drilled passage 12 leads the fuel gas to the tube 6. In a two-hose cutting torch such as illustrated, the oxygen flow is divided. The passages 13, 14 and 15 and chamber 16 conduct preheating oxygen from the oxygen connection to the tube 4, past an adjusting valve 17 operating in the chamber 16.

Another passage 18 is drilled from the socket of the oxygen connection 9 to a chamber 20, the axis of which is transverse to the length of the torch. The outer end of this chamber is closed by a cap 21 screwed into a socket in one side of the block, the joint being made tight by a gasket 22. A passage 23 of smaller diameter than the chamber 20 and in line with it communicates with another passage 24, which extends forwardly to the cutting oxygen tube 5. On the shoulder at the junction between the chamber 20 and the passage 23 an annular lip or valve seat 25 is formed.

A cutting oxygen valve 26 is movable in the chamber 20 to and away from the seat, and is normally closed against the seat by a spring 27 interposed between the valve and the back cap 21. This valve is used to open and close the passageway in the torch for the cutting oxygen. It is unseated by pressure applied through a plunger or thrust-rod 28, which is slidable in openings in the body and in a screw plug 29, which are axially alined with the valve. The plug 29 is screwed into a socket in the side of the block opposite from the socket for the cap 21, and compresses a packing disc 30, the edge of an opening in which clasps the rod 28 to insure a gas-tight joint.

A thimble 31 is secured to the side of the block 2 over the removable plug 29, by means of screws 32 which pass through a basal flange 33 of the thimble. The outer end of the rod 28 projects into this thimble, and the thimble serves as a bearing for the stem 34 of a handle 35, which has a wing-piece 36 for manipulation. The outer end of the thrust rod is preferably received in a recess 37 in the inner end of the handle stem.

The thimble 31 has two steep helical slots 38 cut through its wall, the edges 39 of these slots constituting cam elements. A transverse pin 40 is fixed in the stem of the handle so that its projecting ends coact with the cams. When the handle is turned in one direction, the cam action carries it inward, thrusting the rod 28, which in turn pushes the valve 26 away from its seat, permitting the oxygen to pass. The inner ends of the cams are formed to make rest stops 41. When the ends of the pin 40 are on these terminals the spring is powerless to close the valve. The first contrary turn of the handle releases the spring to close the valve, and in so doing to restore the handle to normal position. The lengths of the cams correspond to about a quarter turn of the handle. This cam mechanism obtains a substantial mechanical advantage for the handle in operating the valve and thereby reduces the effort required to open the valve. The action is exceedingly easy and prompt in both opening and closing, and the operation of the control has no tendency to move the torch. The thimble 31 is preferably of different material from the block 2. Valve blocks are most commonly constructed from brass, but a steel thimble is more resistant to wear along the cam slots. The portion of the slots which is most liable to wear is the junction of the helical cam face with the rest stop.

While the preferred embodiment of the invention has been described in detail, it will be understood that various changes may be made in the form, number and arrangement of parts.

I claim:

1. A machine cutting torch comprising an elongated torch body, a valve block connected to the rearward end of the torch body and having a conduit therein through which cutting oxygen flows to the torch body, a valve element in said conduit to control the passage of oxygen through the conduit, a spring urging the valve element into closed position, manually actuated means for moving the valve element into open position, said means including a rotatable and slidable stem extending outward from the valve block in a direction substantially normal to the long dimension of the torch body, a bearing in which the stem is rotatably supported, a handle at the outer end of the stem extending to opposite sides of the axis of the stem so that the stem can be rotated by a couple force applied to the handle, and means for causing the stem to move axially when rotated including a cam surface and a pin, one of which is on the stem and the other of which is on the bearing that supports the stem, all portions of the cam surface beyond its inner end having a pitch so correlated with the spring pressure that the spring snaps the valve element into closed position.

2. A machine cutting torch comprising an elongated torch body, a valve block connected to the rearward end of the torch body and having a conduit therein through which cutting oxygen flows to the torch body, a valve element in said conduit to control the passage of oxygen through the conduit, a spring urging the valve element into closed position, manually actuated means for moving the valve element into open position, said means including a rotatable and slidable stem extending outward from the valve block in a direction substantially normal to the long dimension of the torch body, a bearing in which the stem is rotatably supported, a handle at the outer end of the stem extending to opposite sides of the axis of the stem so that the stem can be rotated by a couple force applied to the handle, and means for causing the stem to move axially when rotated including a cam surface and a pin, one of which is on the stem and the other of which is on the bearing that supports the stem, said cam surface having a rest stop at one end for holding the stem in its displaced position against the pressure of the spring, the cam surface beyond the rest stop having such a pitch in proportion to the spring strength that the spring moves the stem and shifts the valve element into closed position as soon as the pin is moved beyond the rest stop of the cam surface.

3. A machine cutting torch comprising an elongated torch body, a valve block connected to the rearward end of the torch body and having a conduit therein through which cutting oxygen flows to the torch body, a valve element in said conduit to control the passage of oxygen through the conduit, a spring urging the valve element into closed position, manually actuated means for moving the valve element into open position, said means including a rotatable and slidable stem extending outward from the valve block in a direction substantially normal to the long dimension of the torch body, a bearing in which the stem is rotatably supported, a handle at the outer end of the stem extending to opposite sides of the axis of the stem so that the stem can be rotated by a couple force applied to the handle, and means for causing the stem to move axially when rotated including a cam slot in the bearing in which the stem is supported, a pin in the stem extending into the cam slot, said cam slot having a rest stop at its inner end and such a pitch throughout the remainder of its length that the handle is rotated and the valve element moved into closed position by the pressure of the spring whenever the handle is rotated to move the pin out of the rest stop.

WILLIAM J. SHERMAN.